United States Patent
Raj et al.

(10) Patent No.: US 10,192,021 B1
(45) Date of Patent: Jan. 29, 2019

(54) GENERATING AND INSERTING METAL AND METAL ETCH SHAPES IN A LAYOUT TO CORRECT DESIGN RULE ERRORS

(71) Applicant: Cadence Design Systems, Inc., San Jose, CA (US)

(72) Inventors: Satish Raj, Saratoga, CA (US); Ying-Hui Wang, Houlong Township (TW); Joyjeet Bose, Noida (IN); Sachin Shrivastava, Noida (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 13 days.

(21) Appl. No.: 15/438,617

(22) Filed: Feb. 21, 2017

(51) Int. Cl.
*G06F 17/50* (2006.01)

(52) U.S. Cl.
CPC ...... *G06F 17/5081* (2013.01); *G06F 17/5072* (2013.01); *G06F 2217/06* (2013.01)

(58) Field of Classification Search
CPC ............. G06F 17/5072; G06F 17/5081; G06F 2217/06
See application file for complete search history.

(56) References Cited

U.S. PATENT DOCUMENTS

| | | | | |
|---|---|---|---|---|
| 7,882,480 B2* | 2/2011 | Ye | ............................. | G03F 1/36 716/53 |
| 7,934,177 B2* | 4/2011 | Shin | ......................... | G03F 1/36 716/55 |
| 8,103,985 B2* | 1/2012 | Sweis | ....................... | G03F 1/70 716/53 |
| 8,211,807 B2* | 7/2012 | Chen | ................... | H01L 21/0337 257/E21.257 |
| 8,392,856 B2* | 3/2013 | Misaka | ............... | G06F 17/5072 716/134 |
| 8,404,403 B2* | 3/2013 | Ogadhoh | .................. | G03F 1/36 430/5 |
| 8,418,111 B2* | 4/2013 | Chen | .................... | G06F 17/5077 716/119 |
| 8,448,120 B2* | 5/2013 | Huang | ...................... | G03F 1/36 703/23 |
| 8,560,998 B1 | 10/2013 | Salowe et al. | | |
| 8,572,521 B2* | 10/2013 | Chen | ......................... | G03F 1/70 716/52 |
| 8,629,064 B2* | 1/2014 | Li | ............................. | G03F 1/36 257/E21.038 |
| 8,769,467 B2 | 7/2014 | Chyan et al. | | |
| 8,813,006 B1 | 8/2014 | Parameswaran et al. | | |
| 8,826,193 B1* | 9/2014 | Du | ............................ | G03F 1/70 716/51 |

(Continued)

*Primary Examiner* — Naum B Levin
(74) *Attorney, Agent, or Firm* — Foley & Lardner LLP

(57) ABSTRACT

Embodiments relate to physically implementing an integrated circuit design while conforming to complex design rule constraints. According to some aspects, embodiments relate to an automated method for generating shapes for correcting design rule errors such as line end-to-end spacing violations. In these and other embodiments, the automated method determines the errors post-placement and automatically generates the required shapes, taking into account additional process design rules and neighboring shapes. Some embodiments consider clusters of objects, potential legal areas between line-ends, merging of potential legal areas and generation of various shapes to produce a design rule correct layout.

20 Claims, 12 Drawing Sheets

(56) References Cited

U.S. PATENT DOCUMENTS

| | | | | |
|---|---|---|---|---|
| 8,898,600 | B2* | 11/2014 | Chen | G06F 17/5072 |
| | | | | 716/51 |
| 8,914,763 | B1 | 12/2014 | Raj et al. | |
| 8,918,746 | B1* | 12/2014 | Yuan | G06F 17/50 |
| | | | | 250/492.22 |
| 9,245,076 | B2* | 1/2016 | Gerousis | G06F 17/5077 |
| 9,262,558 | B2* | 2/2016 | Huang | G03F 1/36 |
| 9,384,317 | B1 | 7/2016 | Salowe et al. | |
| 9,425,049 | B2* | 8/2016 | Huang | H01L 21/0338 |
| 9,652,579 | B1* | 5/2017 | Arkhipov | G06F 17/5081 |
| 9,698,016 | B2* | 7/2017 | Huang | H01L 21/0338 |
| 9,761,451 | B2* | 9/2017 | Huang | H01L 21/0338 |
| 9,798,852 | B2* | 10/2017 | Yuan | G06F 17/5081 |
| 2016/0070841 | A1 | 3/2016 | Salowe et al. | |
| 2016/0378906 | A1* | 12/2016 | Yuan | G06F 17/5081 |
| | | | | 716/52 |
| 2017/0017745 | A1* | 1/2017 | Wang | G06F 17/5068 |

* cited by examiner

GENERATING AND INSERTING METAL AND METAL ETCH SHAPES IN A LAYOUT TO CORRECT DESIGN RULE ERRORS

TECHNICAL FIELD

The present disclosure relates to integrated circuits, and more particularly to methods and apparatuses for implementing designs of integrated circuits in processes that include design rules.

BACKGROUND

Electronic design automation (EDA) tools are used to design integrated circuits. Integrated circuits can include many thousands and perhaps millions of circuit elements (e.g., transistors, logic gates, diodes, etc.) and interconnecting wires and busses. The circuit elements and wires can be formed on many different layers, with various interconnections (e.g., vias) between layers. EDA tools allow a designer to describe an integrated circuit based on its desired behavior, and then transform that behavioral description into a set of geometric shapes called a layout which forms the circuit elements and wires for all the different layers.

As integrated circuit feature sizes continually get smaller and smaller, EDA tools need to be aware of an ever-increasing number of constraints (e.g., design rules or design rule manuals (DRMs)) to ensure that shapes are placed correctly for a target fabrication process. For example, some foundries specify that shapes of a design can only be placed in parallel routing tracks (hereinafter simply "tracks") running in one direction of a given layer or portion of a layer and these tracks must have minimum spacing requirements (e.g., forbidden pitch). Moreover, to allow a design to be implemented by multiple patterning processes (e.g., double patterning), shapes in adjacent tracks may have alternate colors (e.g., B for shapes to be included in a "blue" photomask, C for shapes to be included in a "cyan" photomask, etc.) and the widths for shapes in adjacent tracks may need to conform to further requirements. Still further, even separate metal shapes within a track must conform to minimum spacing requirements (e.g., line end-to-end spacing).

Some EDA tools such as design rule checkers can be used to assist a designer in identifying and fixing IC designs having design rule violations. However, further automation and assistance for helping a designer with many of these violations is needed.

SUMMARY

Embodiments according to the present disclosure relate to physically implementing an integrated circuit design while conforming to complex design rule constraints. According to some aspects, embodiments relate to an automated method for generating shapes for correcting design rule errors such as line end-to-end spacing violations. In these and other embodiments, the automated method determines the errors post-placement and automatically generates the required shapes, taking into account additional process design rules and neighboring shapes. Some embodiments consider clusters of objects, potential legal areas between line-ends, merging of potential legal areas and generation of various shapes to produce a design rule correct layout.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
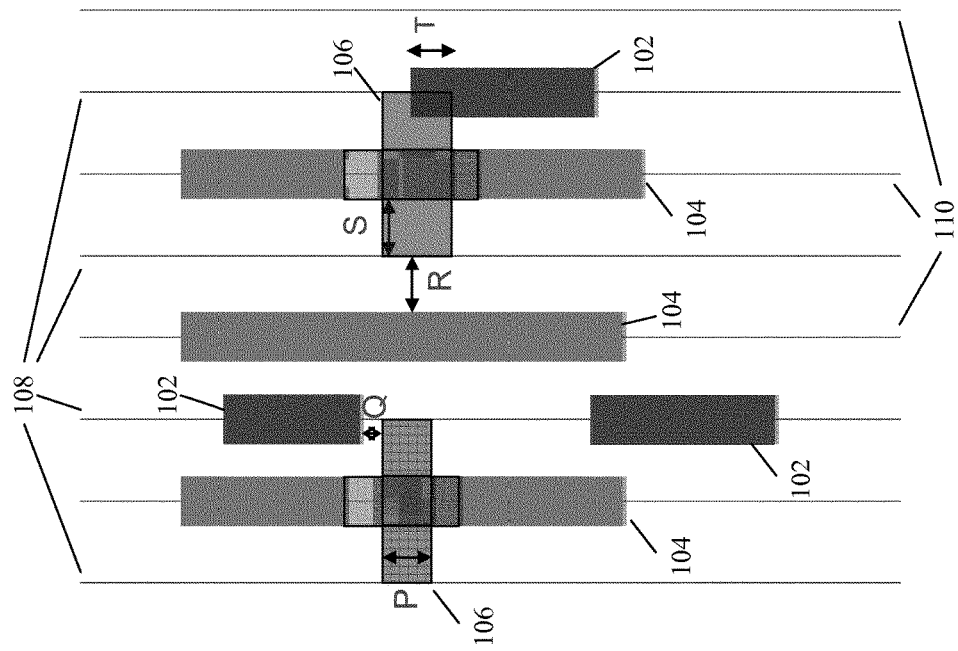
FIG. 1 is a diagram illustrating certain design rules in connection with an integrated circuit design.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, embodiments relate to an automated process for generating shapes for correcting design rule errors such as line end-to-end spacing violations. Embodiments determine the errors post-placement and automatically generate the required shapes, taking into account additional process design rules and neighboring shapes. In some embodiments, an algorithm is used to consider clusters of objects, potential legal areas between line-ends, merging of potential legal areas and generation of various shapes to produce a design rule correct layout.

The present applicants have noted that a set of design rules, requirements, or constraints (hereinafter design rules or rules collectively) that govern the physical implementation of integrated circuit designs need to be taken into consideration during the design of integrated circuits. Illustrative design rules may include, for example, a minimum spacing design rule governing the minimum spacing between two adjacent wires, design rules governing which tracks associated with certain widths may be situated immediately adjacent to another track associated with a width (e.g., pair rules or BC rules where B stands for blue and C stands for cyan in double patterning governing which two-width combinations are legal or triplet rule or BCB rule governing which three-width combinations are legal, etc.), one or more other design rules such as a minimum length rule governing the minimum length required for an interconnect segment, a same track line-end design rule, a different track line-end design rule, a keep-out design rule, or one or more design rules governing repetitive track patterns, etc.

The present applicants further recognize that various techniques can be employed during the design process to prevent or correct some of these design rule violations. For example, in certain advanced process node technologies, metal segments can be placed in a track end-to-end at less than design rule spacing requirements. It is allowed to connect the line-ends with another metal shape and introduce an etching shape that will trim or cut the metal shapes in the track so as to conform the design with the design rule spacing requirement. More particularly, as will be appreciated by those skilled in the art, some processes such as self-aligned double patterning (SADP) processes do not allow space between certain line ends in the same track, and so additional metal shapes are added to connect these line ends. As further appreciated by those skilled in the art, etching (e.g., "trim" metal) shapes are placed on an etching layer which may have multiple (e.g., dual or triple) masks and constitute a separate mask layer. Since these and other advanced process nodes are multi-patterned, certain different and same mask metal spacing rules should be considered while generating these shapes. This allows the placement of design objects to be more compact, which may be very useful when working in advanced nodes.

In a custom layout, metal and metal etch shapes can be generated manually by a designer using a router or similar EDA tool and/or with the help of custom scripts. These manually generated shapes and/or custom scripts are generally not scalable to larger design sizes. The design rules considered during this manual intervention are limited to those supported by the router and provided to the tool through APIs, for example scripts for adding "trim" metal or etching shapes. Also, during manual intervention, it is difficult to make optimization trade-offs such as the alignment of etch metal, especially if the placement is not uniform across multiple design objects. And in any event, manual intervention is not desirable or scalable due to the amount of time required to process each violating area.

A method to automatically introduce these additional shapes and correct the design rule errors is therefore needed.

For illustrating application of these certain design rules, an example layout shown in FIG. 1 includes shapes 102 that are metal shapes for a first mask in a double patterning process, and shapes 104 that are metal shapes for a second mask in a double patterning process. Both shapes 102, 104 are disposed along corresponding track lines 108, 110 in a color-based track system. Further in the example shown in FIG. 1 are metal trim shapes 106 for trimming metal in the shapes of the first mask. The illustrated design rules include the value 'P', which is the exact allowed width of the trim shape 106. 'Q' is the spacing required between a trim shape 106 for trimming metal in the second mask and a metal shape 102 for the first mask. 'S' is the minimum required trim shape 106 extension past the second mask metal shape 104. 'T' is the minimum overlap required between a trim shape 106 for trimming metal in the second mask and a metal shape 102 for the first mask if the trim shape and metal shape overlap.

FIGS. 2A to 2I illustrate aspects of an example process for automatically generating shapes for correcting design rules in an IC design according to the present embodiments.

Figure 2A:
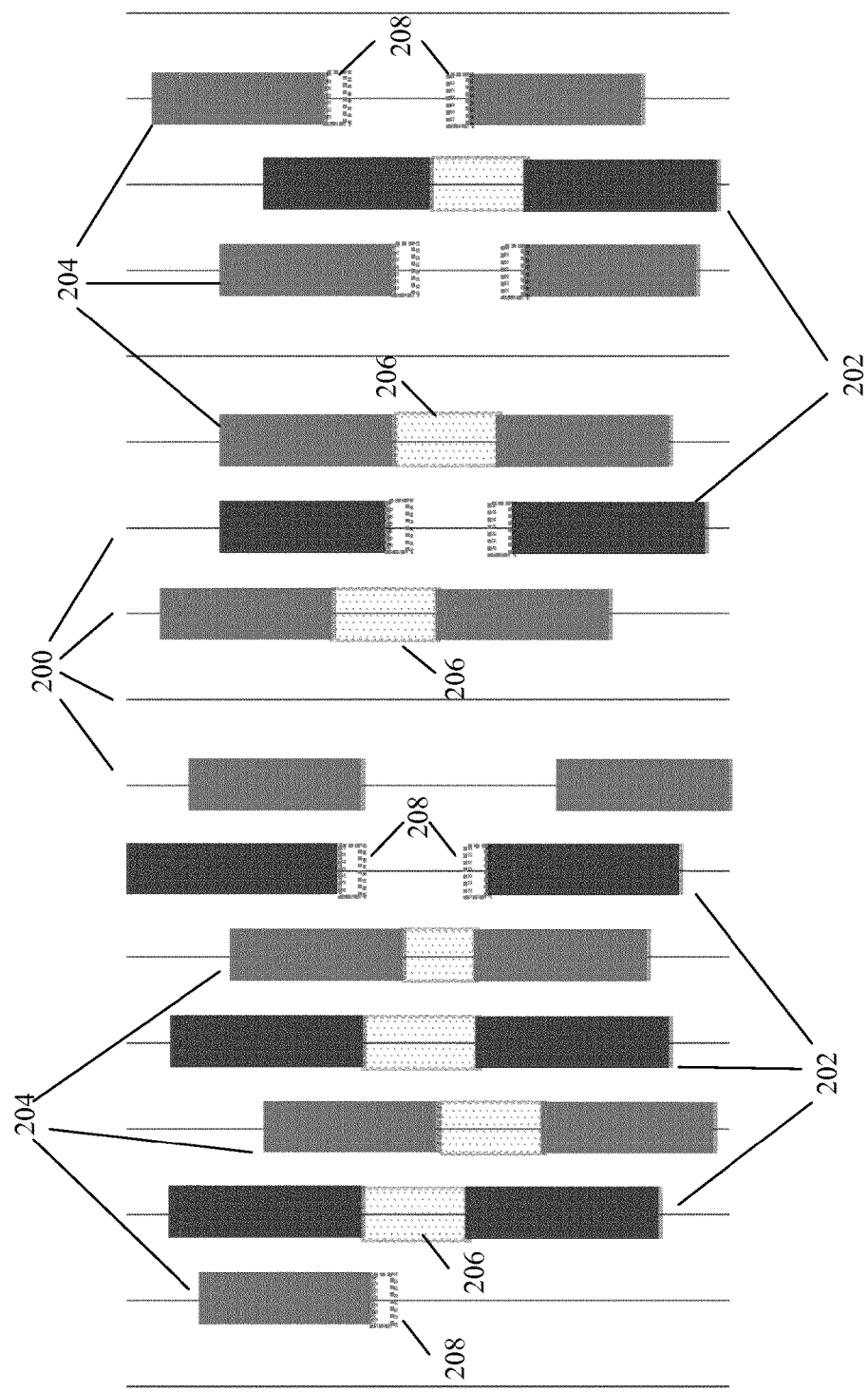
FIGS. 2(A) to 2(I) are diagrams illustrating example aspects of a process for correcting line end-to-end spacing violations according to embodiments.

The example layout shown in FIG. 2A includes shapes 202 that are metal shapes for a first mask in a double patterning process, and shapes 204 that are metal shapes for a second mask in a double patterning process. The shapes 202 and 204 have been placed by a placement tool or methodology (e.g., the layout is post-placement) and centered along tracks 200. FIG. 2A further illustrates an initial step of the example methodology where certain design rule violations are identified by a design rule checker. In particular, FIG. 2A illustrates areas 206 where metal line end-to-end spacing violations 206 have been detected. In other words, these indicate spaces in which the ends of two metal shapes in a same track are too close together according to the design rules. FIG. 2A further illustrates areas 208 where inter-layer spacing rule 'Q' requirements, as described above, are established for shapes that are in adjacent tracks to shapes with line end-to-end spacing violations, and which themselves also do not violate end-to-end spacing requirements.

Figure 2B:
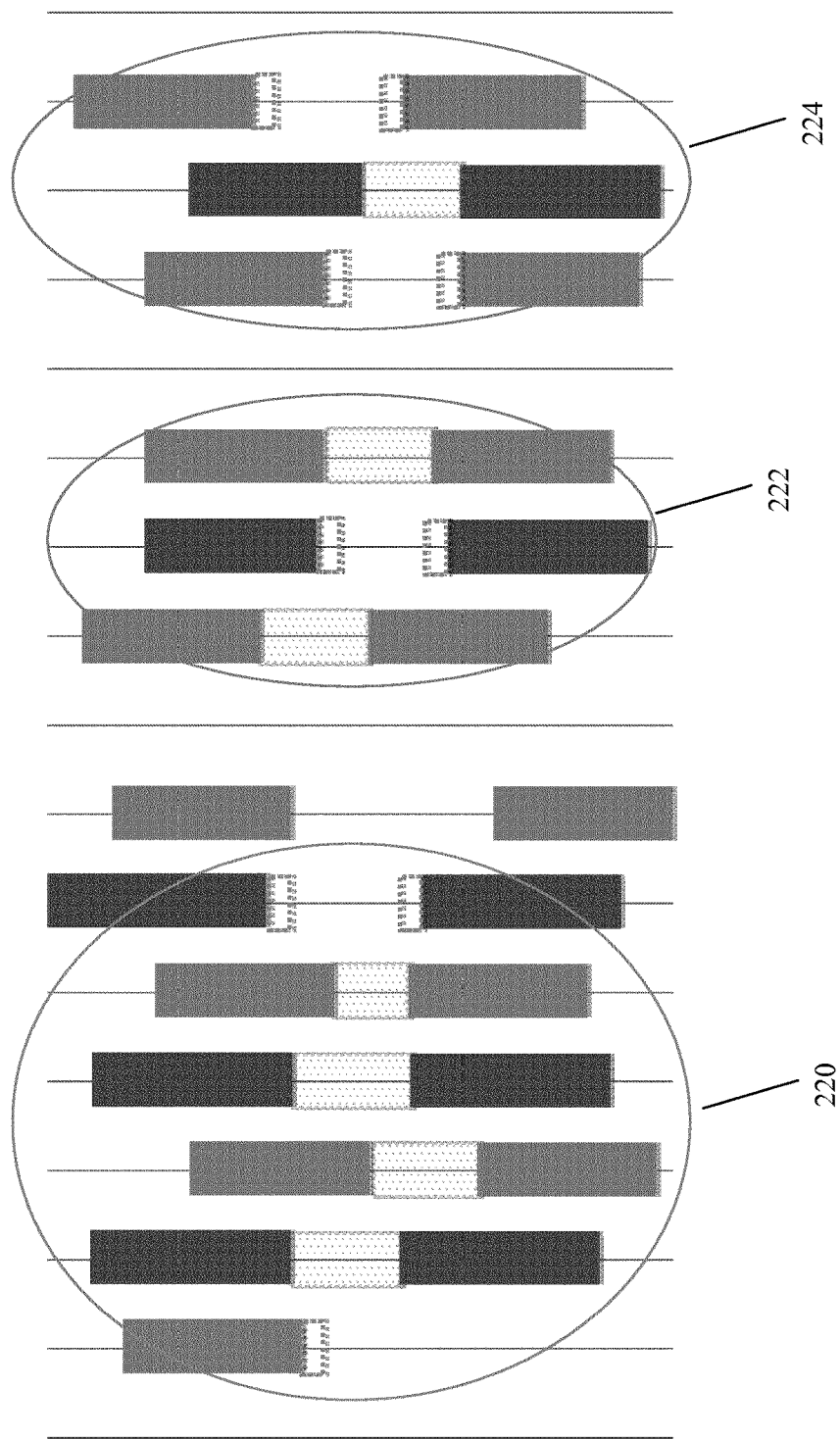

As illustrated in FIG. 2B, a methodology according to the embodiments next determines clusters 220, 222, 224 of shapes in a layout that will be considered individually in further processing according to the embodiments. Each of the clusters is defined by one or more shapes affected by violations 206. The bounds of the clusters are established by determining whether the shapes in the set have any interaction between shapes in adjacent tracks with respect to consideration of end-to-end spacing or inter-layer spacing rules, as will become more apparent from the descriptions below.

Figure 2C:
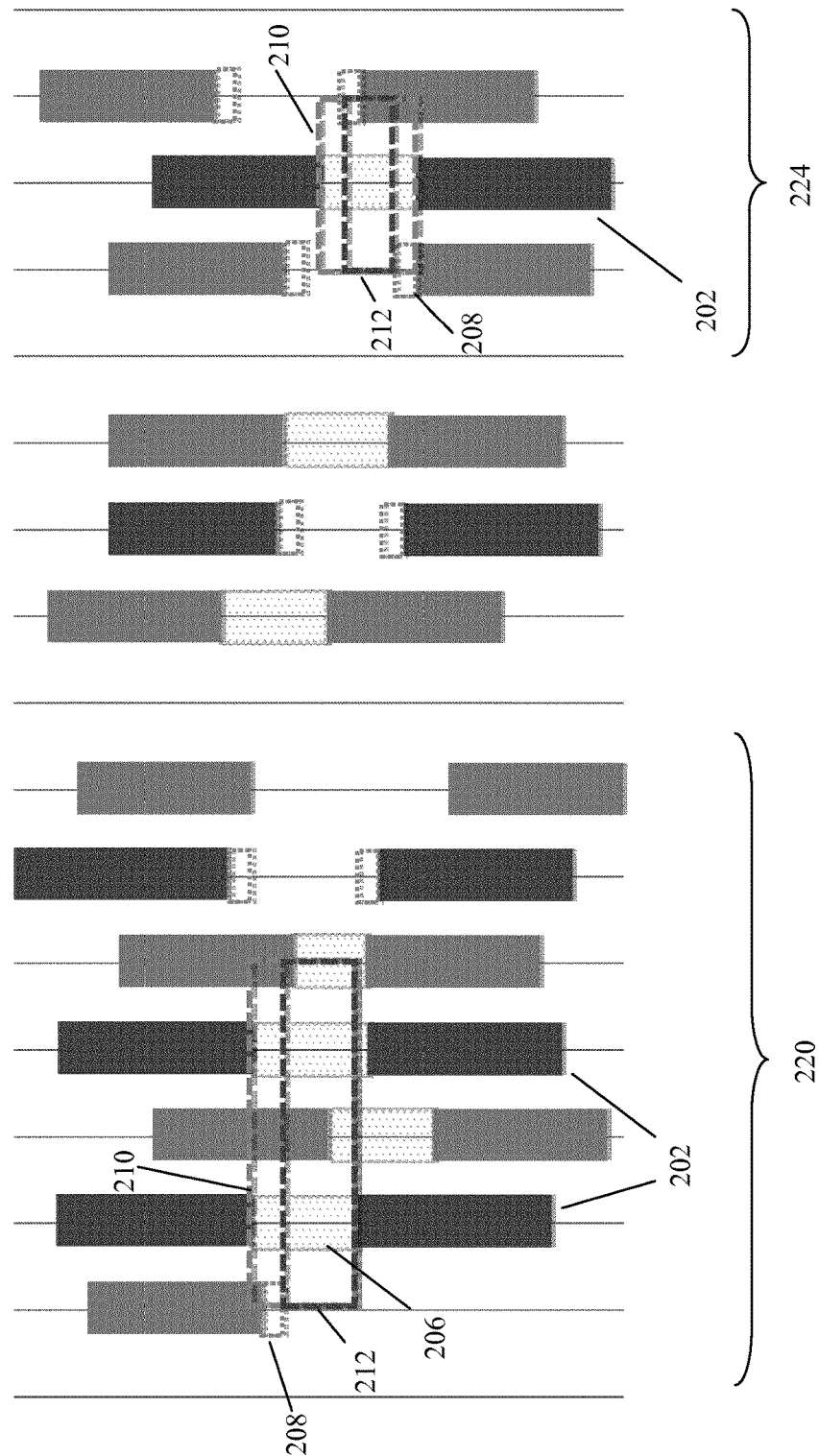

FIG. 2C illustrates initial aspects of correcting metal line end-to-end spacing violations according to an example methodology of the embodiments. More specifically, FIG. 2C shows an example of how legal areas for placement of trim shapes between line ends of metal shapes are derived. As described above, in FIG. 2C, metal shapes 202 are shapes for a first mask in a double patterning process. In each cluster 220 and 222 of shapes having line end-to-end spacing violations in this mask, larger box 210 outlines the total area between the line ends being considered due to line end-to-end spacing violations. For example, this box outlines the largest possible trim shape that could be created that would span the common areas 206 between all shapes 202 in the cluster having line end-to-end violations. The smaller box 212 outlines the legal area in which trim shapes can be placed. The area 212 is determined through a shape lookup in the region and eliminating violating areas. For example, as shown in FIG. 2C, the areas of boxes 210 are reduced to prevent violations of the 'Q' interlayer spacing requirement 208 that would occur if a trim shape was placed in box 210.

Figure 2D:
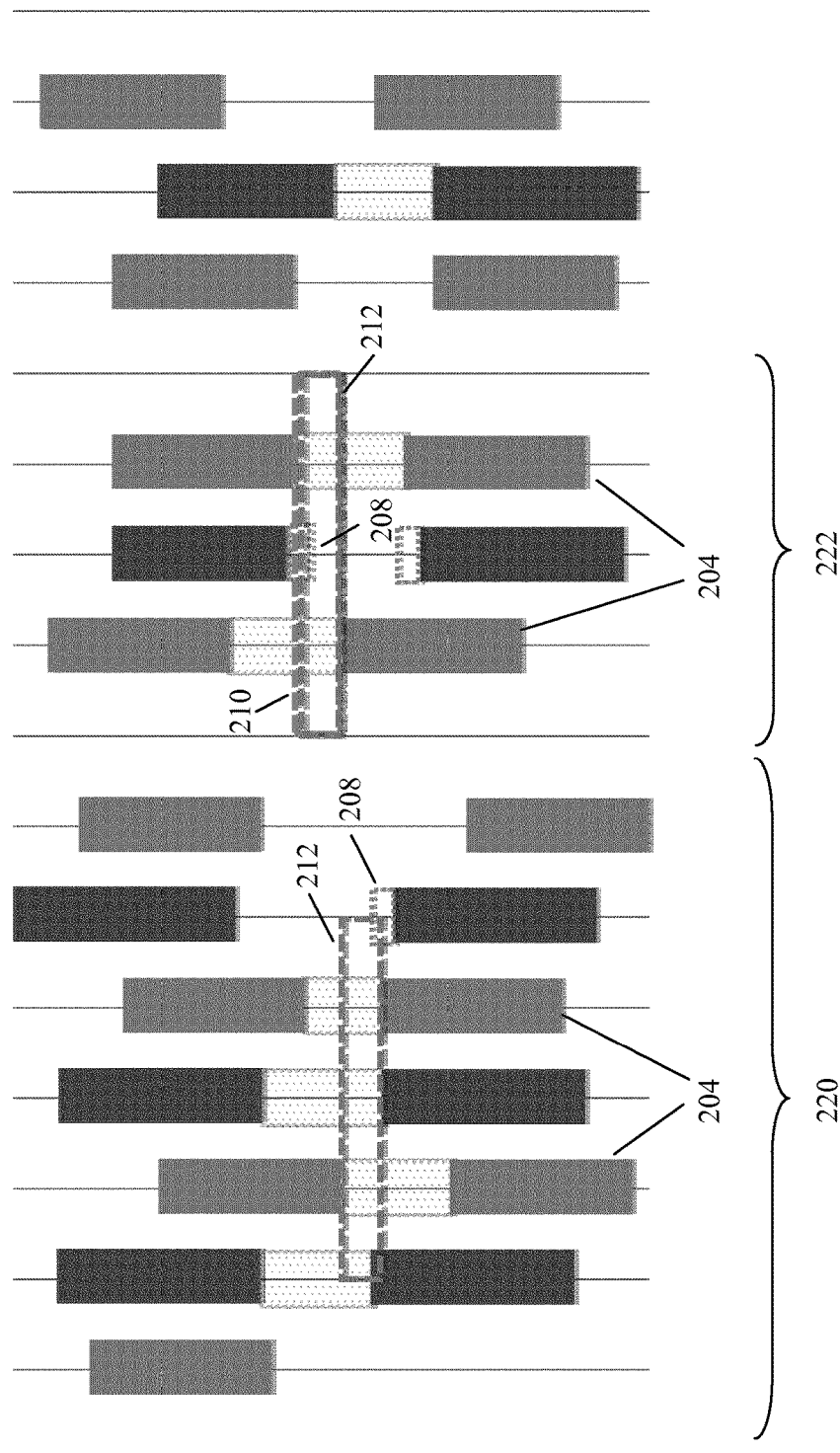

FIG. 2D illustrates similar processing as described in connection with FIG. 2C, but in FIG. 2C, metal shapes 204 are shapes for a second mask in the same double patterning process as in FIG. 2C, with line end-to-end spacing violations. In each cluster 220 and 222 of shapes having line end-to-end spacing violations in this mask, larger box 210 outlines the total area spanning areas 206 between the line ends being considered due to line end-to-end spacing violations. Box 212 outlines the legal area in which trim shapes for trimming metal shapes in this mask can be placed.

Figure 2E:
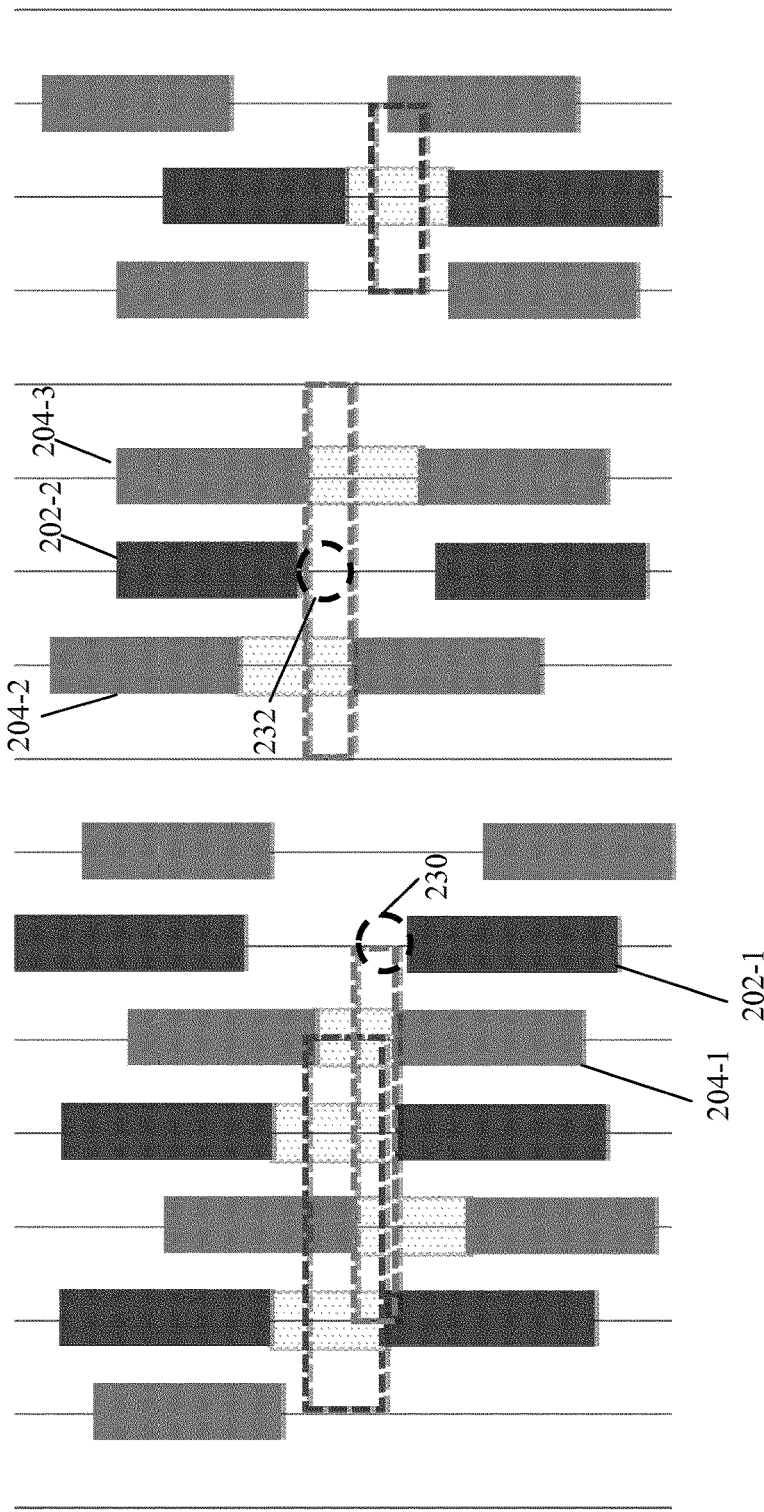

FIG. 2E illustrates aspects of correcting metal line end-to-end spacing violations according to an example methodology of the embodiments. In connection with the processing illustrated in FIG. 2E, a check is performed to determine whether any errors would arise if trim shapes were to be placed in any of the legal areas 212 with correct widths and extensions. Two error cases 230, 232 are detected as shown in the example of FIG. 2E. As shown, error case 230 will occur if a trim shape is inserted for trimming metal shape 204-1 in a second mask for a double patterning process. Error case 232 will occur if a trim shape is inserted in a first mask for trimming metal shape 204-2 and/or 204-3 in the second mask. In both of these cases, the error is an interlayer spacing error between the potential trim shape in the first (second) mask and a metal shape in the second (first) mask.

Figure 2F:
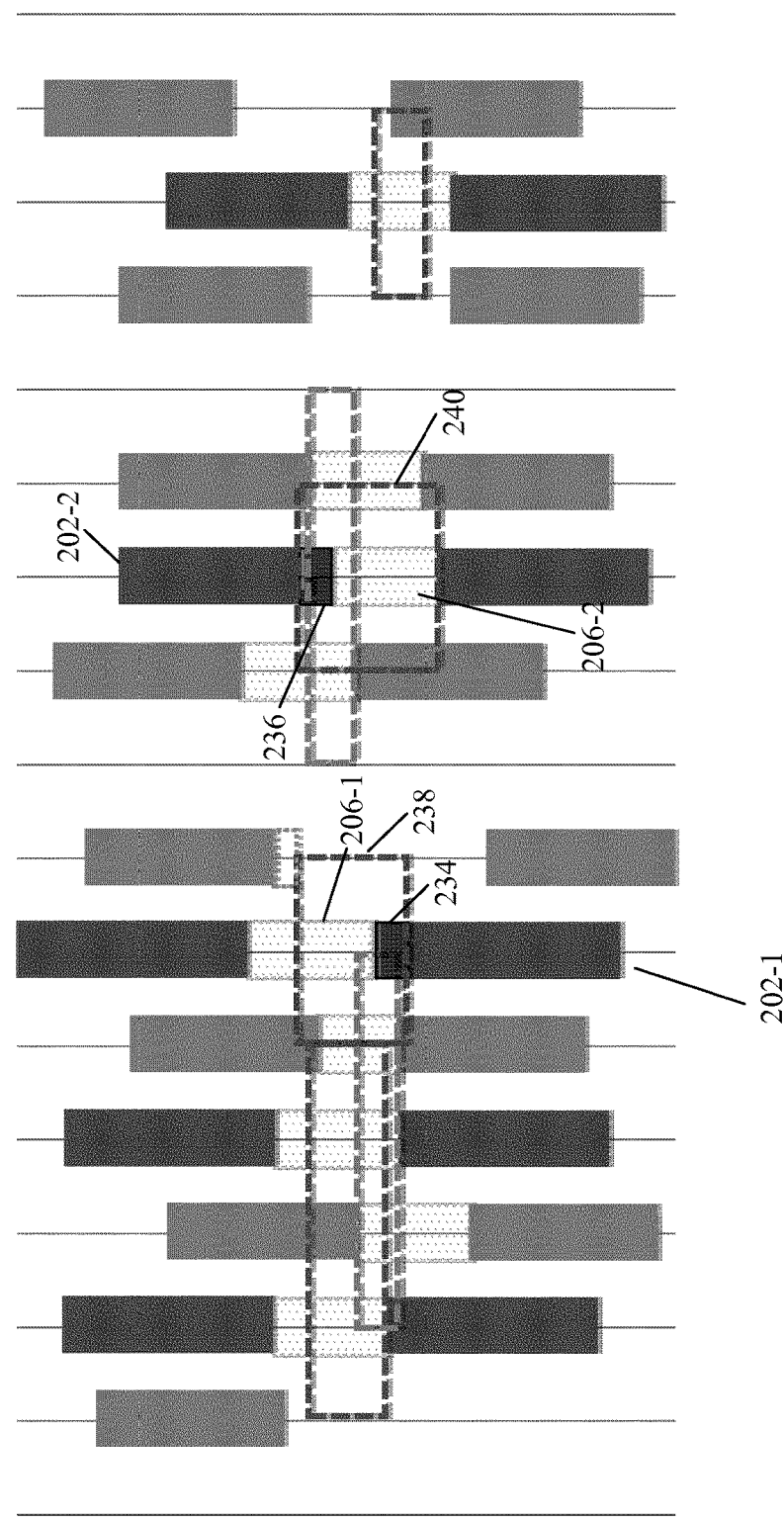

As shown in FIG. 2F, in embodiments a possible fix for errors 230, 232 described in connection with FIG. 2E is attempted by inserting metal shape extensions 234, 236 which will cause new end-to-end spacing violations 206-1 and 206-2 in connection with first mask metal shapes 202-1 and 202-2, respectively. There are three possible cases: (1) no additional error is incurred by extending the metal (2) an error is introduced which can be fixed by inserting a new trim shape (3) an error is introduced which cannot be fixed, which results in a placement error.

More particularly, as shown in FIG. 2F, in an attempt to fix error 230, after inserting extension 234 to the end of first mask metal shape 202-1, a line end-to-end spacing violation is caused with another metal shape in the same track. Box 238 is then drawn, which outlines the legal area between the line ends of these two shapes with the newly caused line end-to-end spacing violations. In this case, however, it is determined that placing new trim shapes in this area 238 will result in a trim shape maximum length violation. More particularly, in this example there is a design rule that specifies that the length of the island formed by abutting trim shapes cannot exceed a specific value. In this case, the example illustrates a violation of this rule which cannot be fixed unless the placement of the cell in which the shapes belong is changed. Accordingly, it is decided for error 230 that this is an unfixable error.

As further shown in FIG. 2F, in an attempt to fix error 232, after inserting extension 236 to the end of first mask metal shape 202-2, a new line end-to-end spacing violation is caused with another metal shape in the same track. Box 240 is then drawn, which outlines the total area between the line ends of these two new tracks with the newly caused line end-to-end spacing violation. In this case, it is decided that error 232 will be fixed by the new trim shape inserted in box 240.

Figure 2G:
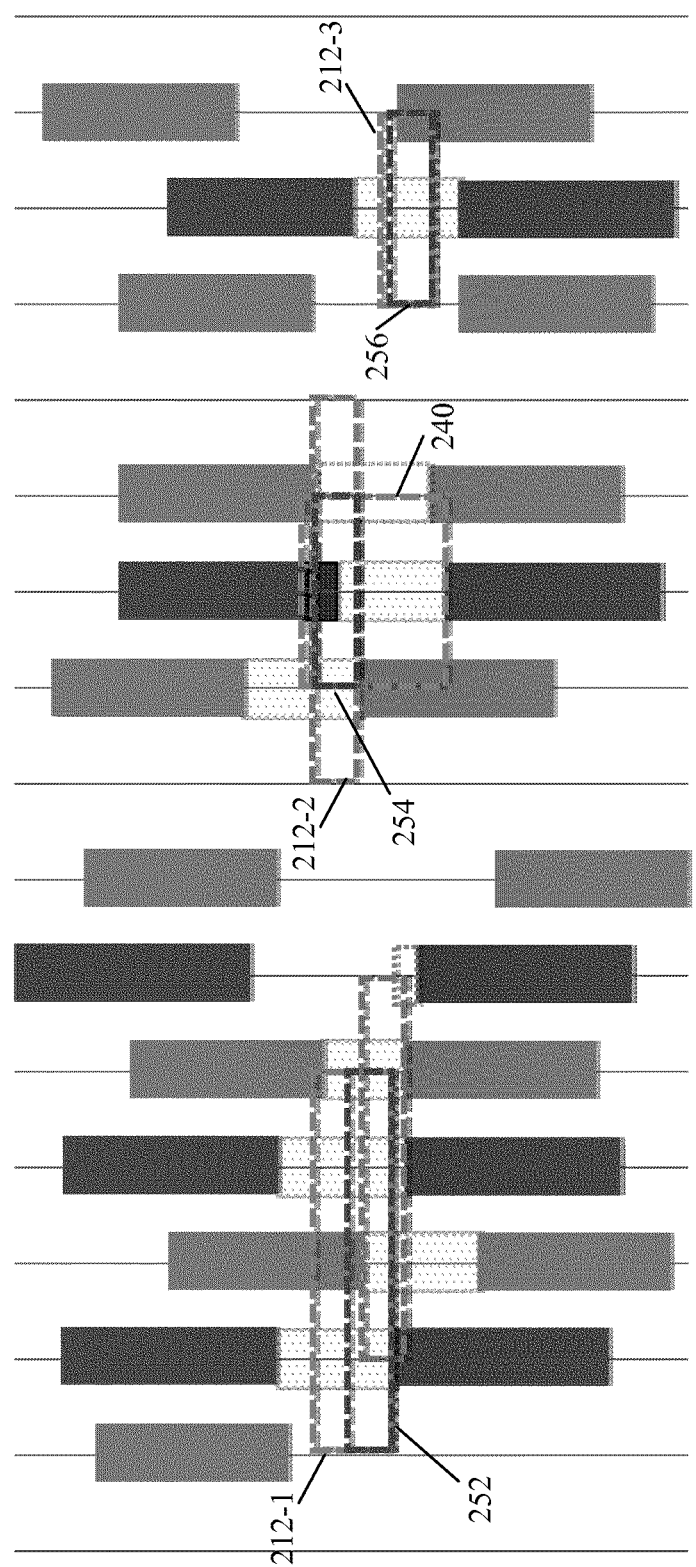

FIG. 2G shows aspects of deriving trim shapes in an example methodology according to embodiments. In this example, the legal area 212-1 for inserting trim shapes for metal shapes in a first mask of a double patterning process is reduced to a smaller area 252. This is determined by minimizing the number of pins extension. More particularly, the smaller area 252 is chosen within the larger area 212-1 because it would result in the least number of extensions (three) to the existing pins.

Further in this example, the legal area 240 is changed to area 254, so as to align this area for inserting trim shapes for metal shapes in a first mask of the double patterning process with area 212-2 for inserting for inserting trim shapes for metal shapes in a second mask of the double patterning process. More particularly, although there is no rule that they need to be aligned, areas 212-2 is the only legal area in which to put the two trim shapes.

Still further in this example, the legal area 212-3 for inserting trim shapes for metal shapes in a first mask of a double patterning process is reduced to a smaller area 256. This area is determined by maximizing overlap. More particularly, maximizing overlap is necessary to meet the minimum overlap rule between trim and metal shapes.

Figure 2H:
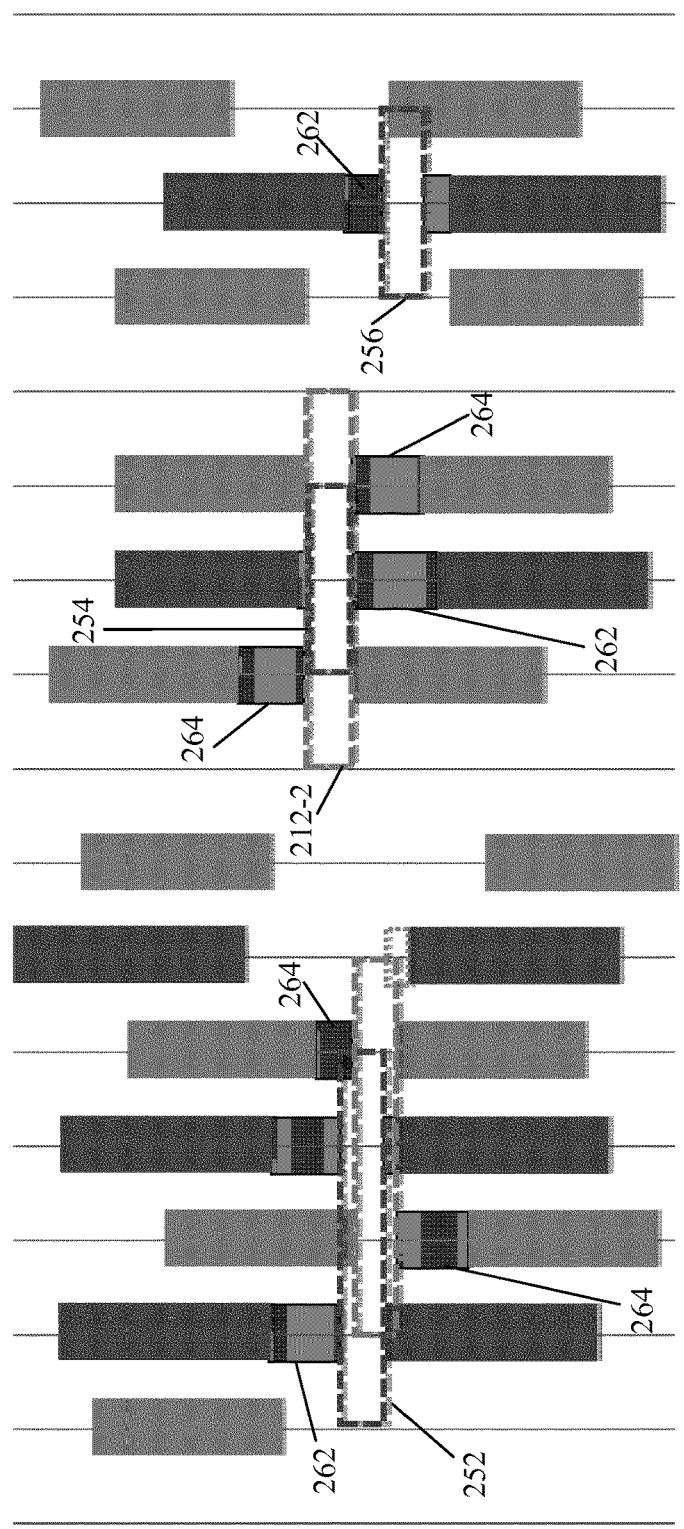

FIG. 2H shows aspects of creating extension metal in an example methodology according to embodiments. As shown in this example, first mask metal extensions 262 are created and added to the ends of first mask metal shapes so that all the first mask metal shapes abut areas 262, 254 and 256 for inserting trim shapes for cutting first mask metal shapes. Likewise, second mask metal extensions 264 are created and added to the ends of second mask metal shapes so that all the second mask metal shapes abut areas 212-2 and 212-4 for inserting trim shapes for cutting second mask metal shapes.

Figure 2I:
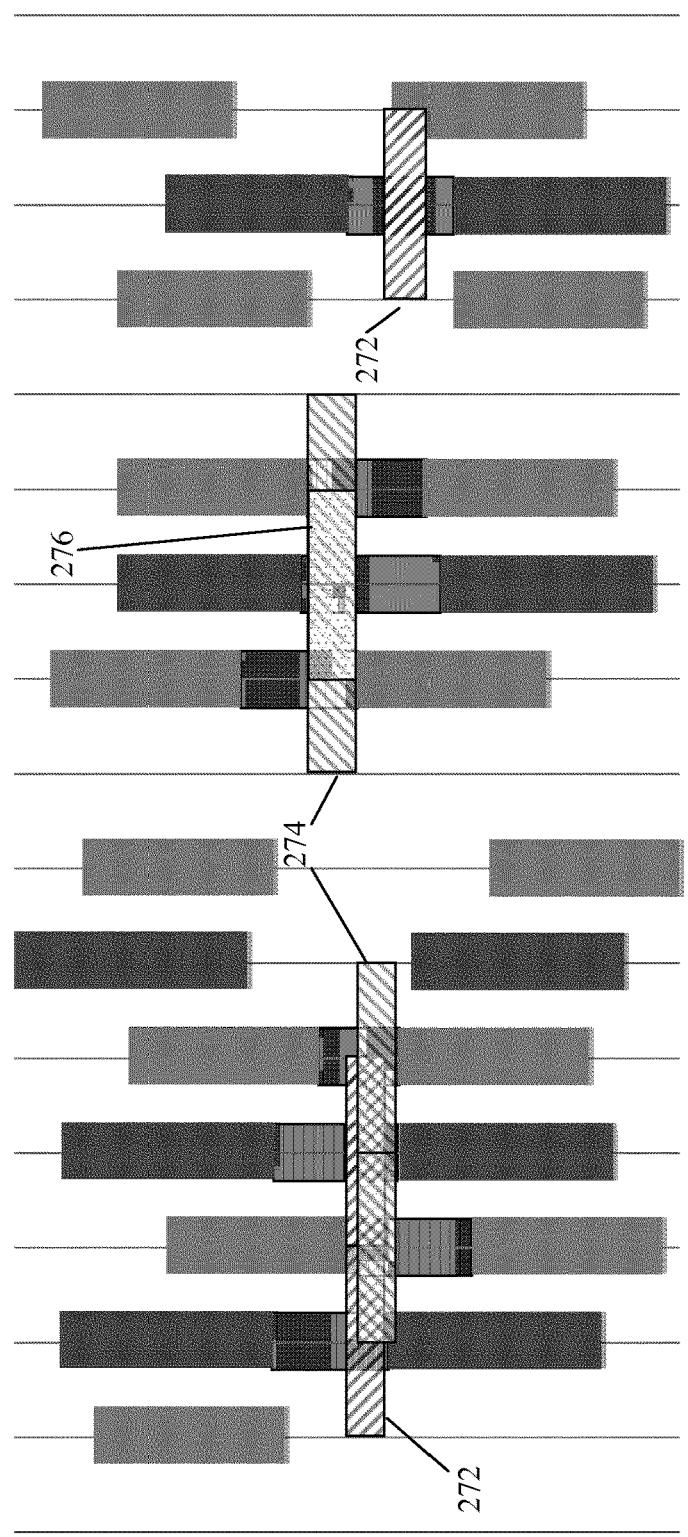

FIG. 2I shows aspects of creating trim shapes in an example methodology according to embodiments. More particularly, using the areas 252, 254 and 256 described above, trim shapes 272 are created for trimming first mask metal shapes. Likewise, using the areas 212-2 and 212-4 described above, trim shapes 274 are created for trimming second mask metal shapes. FIG. 2I further shows an example of creating an additional 'bridge' metal shape 276. As will be appreciated by those skilled in the art, "bridge" shapes such as shape 276 are placed so that when generating the manufacturable shapes (as in GDSII, for example), a continuous line of metal on maskX is generated and the trim layer mask then etches away the metal under the trim shapes.

As should be apparent from the foregoing, the methodology of the example embodiments is an automatic solution able to deal with complex design rules and is scalable to large problem sizes, whereas the conventional method is manual with the assistance of scripts and only works on uniform layouts with similar placement patterns. Moreover, the present embodiments are adaptable to changes in design rules, able to deal with general non-uniform placement of cells, and extensible to handle new design rules.

Figure 3:
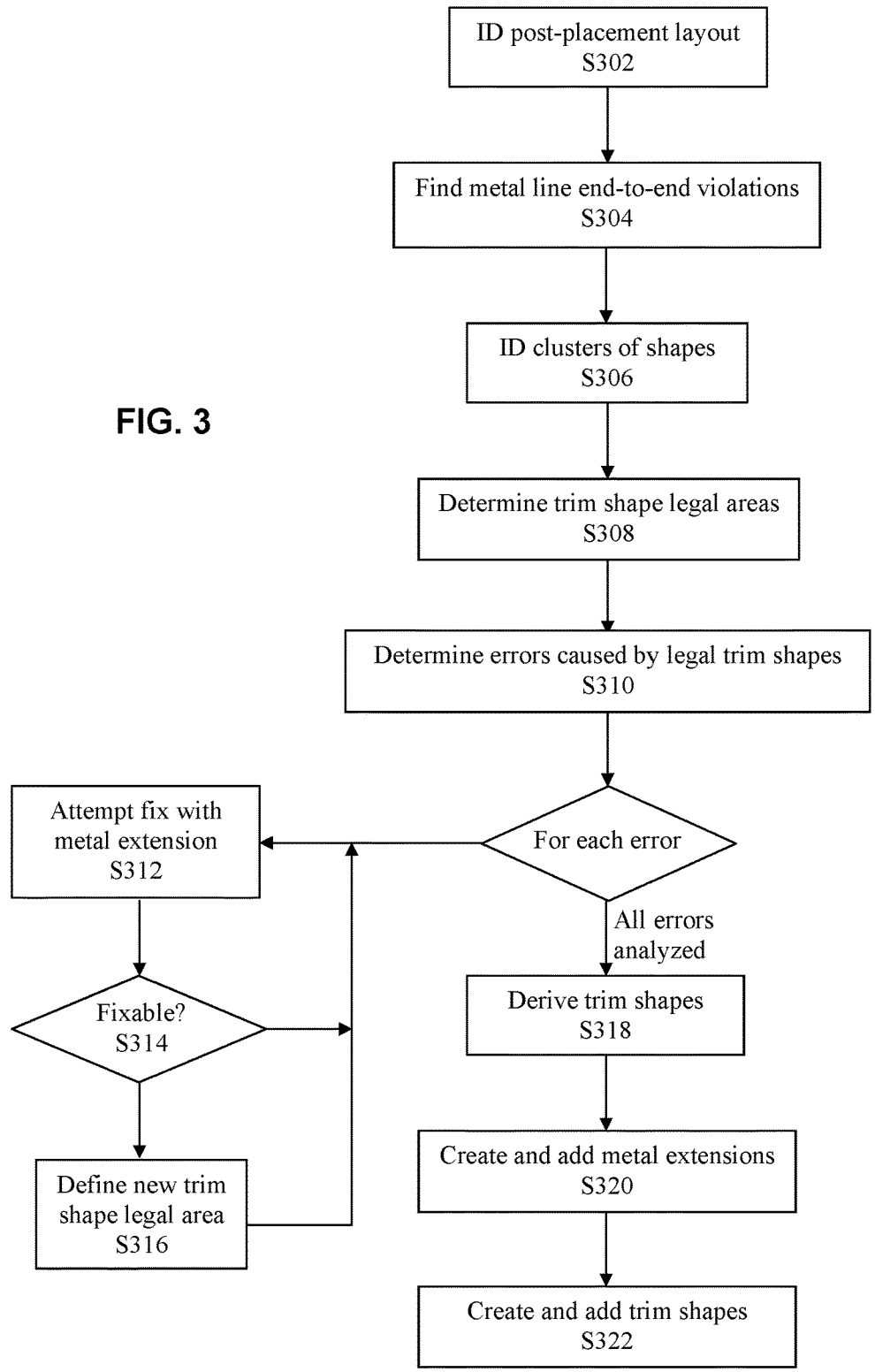
FIG. 3 is a flowchart illustrating an example methodology according to the present embodiments.

FIG. 3 is a flowchart illustrating an example methodology according to these and other embodiments.

In a first step S302, a post-placement layout is received. This can include a layout having metal shapes for a first mask in a double patterning process, and metal shapes for a second mask in a double patterning process. The shapes are typically centered along tracks in a track-based design.

In a next step S304, certain design rule violations in the post-placement layout are identified by a design rule checker. In particular, metal line end-to-end spacing violations are detected between ends of two metal shapes in a same track.

In step S306, a methodology according to the embodiments next determines clusters of shapes in the layout that will be considered individually in further processing according to the embodiments. For example, as described above, this can include identifying a pair of shapes having a line end-to-end spacing violation and determining the maximum set of shapes in adjacent tracks that need to be included for determining additional line end-to-end spacing violations or interlaying spacing violations, and then determining the maximum set of shapes in adjacent tracks with end-to-end spacing errors that need to be considered as a group in order to derive legal trim shape placements.

Next, in step S308, legal areas for placement of trim shapes between line ends of metal shapes are derived. As described above, in each cluster of shapes having line end-to-end spacing violations in the same mask, a larger box is defined that outlines the total area between the line ends being considered due to line end-to-end spacing violations. A smaller box is then defined that outlines the legal area in which trim shapes can be placed. The legal area can be determined through a shape lookup in the region and eliminating violating areas, for example, as described above.

Next in step S310, a check is performed to determine whether any errors would arise if trim shapes were to be placed in any of the legal areas determined above in step S308 with correct widths and extensions. For example, these errors can include minimum directional overlap errors between trim shapes and metal shapes.

For each identified error, processing includes step S312, where a fix is attempted by inserting metal shape extensions which will cause new end-to-end spacing violations. Next is determined in step S314 if the error is unfixable. If not, a new legal area for placing trim metal for fixing this new line end-to-end spacing violation is defined in step S316.

Next, after all errors identified in step S310 have been analyzed, the trim shapes for all the legal areas are derived in step S318. This can include, reducing legal areas to smaller areas for minimizing the number of pins extension in order to reduce the additional amount of metal added, aligning legal areas between first and second masks, and maximizing overlap so as to eliminate minimum directional overlap errors.

Next in step S320, metal extensions are created and added to the ends of all metal shapes affected by line end-to-end violation so that all the metal shapes abut the trim metal shapes determined in step S318.

Finally, in step S322, trim shapes are created in the areas determined in step S318 for trimming the mask metal shapes. This step can also include creating an additional 'bridge' metal shape to enable a continuous line of metal to be streamed out in the layout artwork file (a GDSII file, for example).

Figure 4:
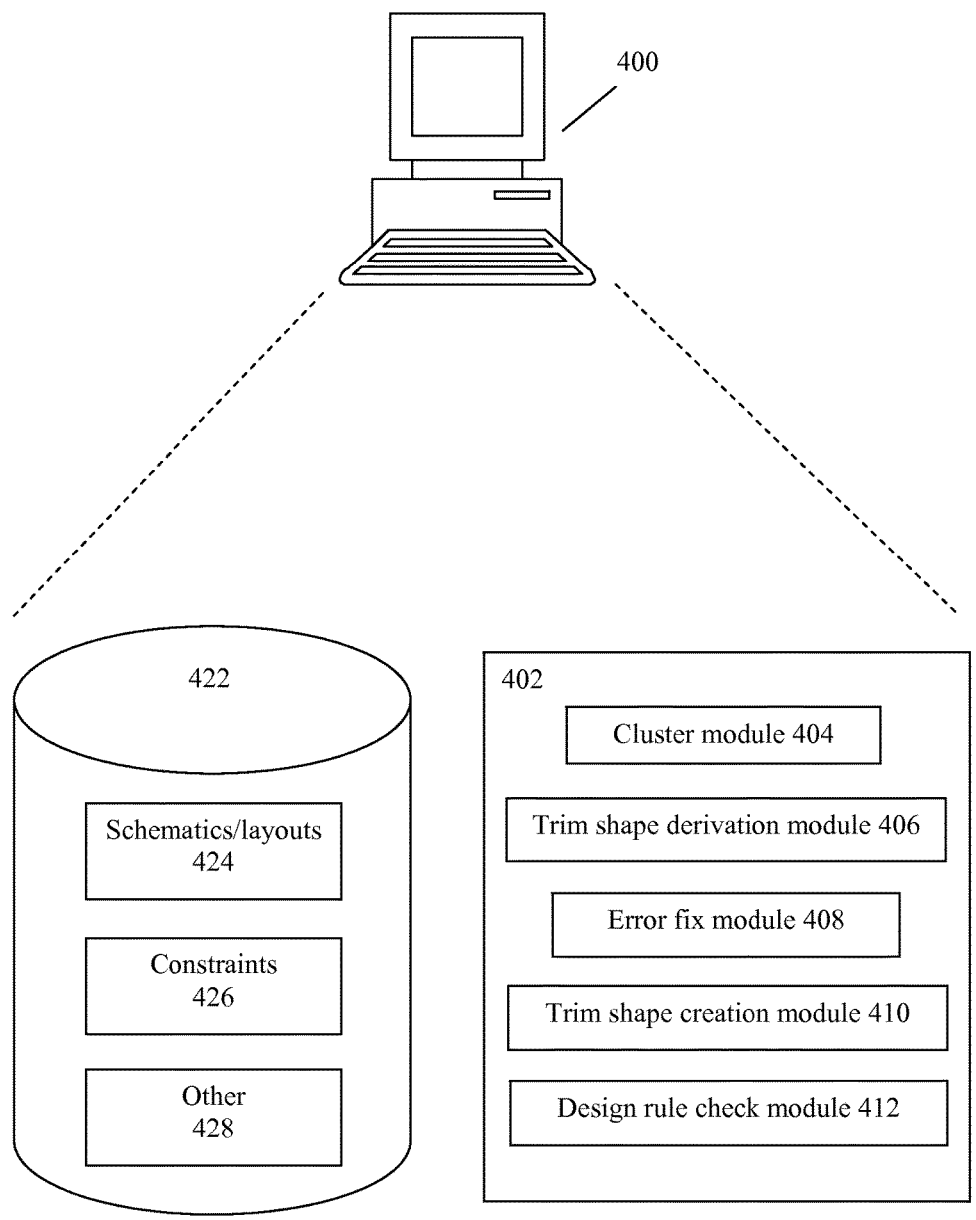
FIG. 4 is a functional block diagram illustrating an example system according to the present embodiments.

FIG. 4 is a functional block diagram of an example system for automatically creating and inserting metal and metal etch shapes for an integrated circuit design according to the present embodiments.

In embodiments, the system 400 can be one or more general purpose computers that are loaded with software (e.g., EDA tools) and/or customized to include hardware for interactively and/or automatically implementing designs of integrated circuits (e.g., ASICs, SOCs, full custom digital ICs, etc.). In some embodiments, the one or more computing systems 400 comprise various components not shown such as processor(s) or processor core(s), memory, disks, etc. The software and/or custom hardware may include interactive or automated modules such as a placer, a routing engine, a layout editor, a wire editor, a design rule checker, a verification engine, a module generator, and/or a floorplanner, etc. as will be appreciated by those skilled in the art.

The one or more computing systems 400 may further write to and read from a local or remote volatile or non-volatile computer accessible storage 422 that stores thereon data or information such as, but not limited to, one or more databases such as post-placement layouts, schematic design database(s) or physical design database(s) 424 (e.g., GDS II or OASIS data, etc.), libraries, rule decks, constraints (e.g., track specifications, minimum spacing, pitch/width requirements, widths, BCB rules, etc.), etc. 426, and/or other information or data 428 (e.g., trim shape locations, etc.) that may be required to support the methodology of the present embodiments. According to certain aspects, design rules in storage 426 are extendable or changeable (e.g., via APIs and the like) without changing other components or data in system 400.

In some embodiments, the one or more computing systems are implemented in a "cloud" configuration and/or a client/server configuration. For example, one or more server computers may be loaded with application software (e.g., a router and/or other EDA tool) for implementing some or all of the methodology of the present embodiments, and one or more client computers can communicate with the server computer(s) via a network to perform some or all of the methodology of the embodiments for a particular design.

In some embodiments, the one or more computing systems 400 may, by various standalone software, hardware modules or combinations thereof 402 (e.g., EDA tool), include a cluster module 404 that identifies clusters of shapes for performing automatic generation of metal and etch shapes for correcting line end-to-end spacing violations according to the embodiments. Modules 402 further includes trim shape derivation module 406 for deriving trim shapes in the identified clusters, error fix module 408 for attempting to fix errors in the identified clusters with additional trim shapes, trim shape creation module 410 for automatically creating the metal and trim shapes in the identified clusters and design rule checker 412 for identifying design rule violations and establishing other design requirements according to the embodiments. It should be noted that any or all of modules 404, 406, 408, 410 and 412 may be implemented by adapting or communicating with certain pre-existing modules (e.g., placer, router, layout editor, design rule checker, etc.) as may be required to implement a methodology to implement design rule correct IC designs according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for implementing an integrated circuit design using a design tool, the method comprising:
   identifying, using the design tool, a plurality of shapes in a post-placement layout of the integrated circuit design;
   determining, using the design tool, a legal area for a trim shape for the identified plurality of shapes based on analysis of one or more design constraints for implementing the integrated circuit design, wherein the legal area is a contiguous area adjacent to certain of the identified plurality of shapes that are aligned in at least two different tracks in a single mask of the integrated circuit design; and
   creating, using the design tool, the trim shape within the legal area and updating the integrated circuit design by adding the created trim shape to the post-placement layout of the integrated circuit design.

2. The method of claim 1, wherein the one or more design constraints include metal line end-to-end spacing between a pair of shapes in a same track of the integrated circuit design.

3. The method of claim 2, wherein the same track includes shapes for a same mask in a multiple patterning process.

4. The method of claim 3, wherein the multiple patterning process is a self-aligned double patterning (SADP) process.

5. The method of claim 1, wherein identifying the plurality of shapes includes:
   identifying a pair of shapes in a same track having metal line end-to-end spacing violations; and
   determining a maximum set of shapes in one or more tracks that are adjacent to the same track and with each other, the adjacent tracks all having shapes with metal line end-to-end spacing violations.

6. The method of claim 5, wherein determining the legal area includes:
identifying a maximum area outlining line end-to-end spacing between the pairs of shapes in the adjacent tracks; and
performing a shape lookup in a region of the integrated circuit design including the maximum area and eliminating portions of the maximum area to prevent violations of the design constraints, thereby arriving at the legal area.

7. The method of claim 1, wherein determining the legal area includes:
identifying a maximum area outlining line end-to-end spacing between pairs of shapes in the plurality of shapes; and
performing a shape lookup in a region of the integrated circuit design including the maximum area and eliminating portions of the maximum area to prevent violations of the design constraints, thereby arriving at the legal area.

8. The method of claim 1, further comprising:
creating metal extensions to certain of the plurality of shapes to cause the certain shapes to abut with the created trim shape; and
adding the created metal extensions to the integrated circuit design.

9. The method of claim 1, wherein creating the trim shape includes reducing the legal area so as to reduce the number of extensions.

10. The method of claim 1, wherein creating the trim shape includes reducing the legal area so as to align the legal area with another legal area.

11. The method of claim 1, wherein creating the trim shape includes reducing the legal area so as to eliminate minimum directional overlap errors.

12. A computer readable storage medium having instructions stored thereon which, when executed by a computer, cause the computer to execute a method for physically implementing a design for an integrated circuit, the method comprising:
identifying a plurality of shapes in a post-placement layout of the integrated circuit design;
determining a legal area for a trim shape for the identified plurality of shapes based on analysis of one or more design constraints associated with physically implementing the integrated circuit design, wherein the legal area is a contiguous area adjacent to certain of the identified plurality of shapes that are aligned in at least two different tracks in a single mask of the integrated circuit design; and
creating the trim shape within the legal area and updating the integrated circuit design by adding the created trim shape to the post-placement layout of the integrated circuit design.

13. The computer-readable storage medium of claim 12, wherein the one or more design constraints include metal line end-to-end spacing between a pair of shapes in a same track of the integrated circuit design.

14. The computer-readable storage medium of claim 12, wherein identifying the plurality of shapes includes:
identifying a pair of shapes in a same track having metal line end-to-end spacing violations; and
determining a maximum set of shapes in one or more tracks that are adjacent to the same track and with each other, the adjacent tracks all having shapes with metal line end-to-end spacing violations.

15. The computer-readable storage medium of claim 12, wherein determining the legal area includes:
identifying a maximum area outlining line end-to-end spacing between pairs of shapes in the plurality of shapes; and
performing a shape lookup in a region of the integrated circuit design including the maximum area and eliminating portions of the maximum area to prevent violations of the design constraints, thereby arriving at the legal area.

16. The computer-readable storage medium of claim 14, wherein determining the legal area includes:
identifying a maximum area outlining line end-to-end spacing between the pairs of shapes in the adjacent tracks; and
performing a shape lookup in a region of the integrated circuit design including the maximum area and eliminating portions of the maximum area to prevent violations of the design constraints, thereby arriving at the legal area.

17. The computer-readable storage medium of claim 12, further comprising:
creating metal extensions to certain of the plurality of shapes to cause the certain shapes to abut with the created trim shape; and
adding the created metal extensions to the integrated circuit design.

18. A system for physically implementing a design for an integrated circuit, comprising:
a cluster module for identifying a plurality of shapes in a post-placement layout of the integrated circuit design;
a constraints module for determining a legal area for a trim shape for the identified plurality of shapes based on analysis of one or more design constraints associated with physically implementing the integrated circuit design, wherein the legal area is a contiguous area adjacent to certain of the identified plurality of shapes that are aligned in at least two different tracks in a single mask of the integrated circuit design; and
a trim shape creation module for creating the trim shape within the legal area and for updating the integrated circuit design by adding the created trim shape to the post-placement layout of the integrated circuit design.

19. The system of claim 18, wherein the post-placement layout comprises a GDSII file, the system further comprising a storage for storing the GDSII file.

20. The system of claim 18, further comprising a storage including a set of design constraints for the process for physically implementing the design for the integrated circuit, the process comprising a multiple patterning process.

* * * * *